United States Patent [19]

Shames et al.

[11] 4,078,575
[45] Mar. 14, 1978

[54] COUPLER FOR DISHWASHER

[76] Inventors: Sidney J. Shames, 57 Holly Pl., Briarcliff Manor; Harold Shames, 5 Agnes Cir., Ardsley, both of N.Y.

[21] Appl. No.: 764,356

[22] Filed: Jan. 31, 1977

[51] Int. Cl.[2] .............................................. B05B 1/22
[52] U.S. Cl. ................................................ 137/562
[58] Field of Search ...................... 137/562, 599, 599.1

[56] References Cited

U.S. PATENT DOCUMENTS

| | | | |
|---|---|---|---|
| 3,011,725 | 12/1961 | Shames et al. | 137/562 X |
| 3,064,678 | 11/1962 | Shames et al. | 137/562 |
| 3,635,243 | 1/1972 | Brezosky | 137/562 X |
| 3,692,053 | 9/1972 | Kaldenberg | 137/562 |
| 4,026,323 | 5/1977 | Goodlaxson | 137/562 |

*Primary Examiner*—Robert G. Nilson
*Attorney, Agent, or Firm*—Norman Lettvin

[57] ABSTRACT

A coupling for dishwashers is provided with a unitary molded plastic body having two nipples extending therefrom, for connection to supply and discharge hoses, and with a separation wall with integral flow deflector, disposed within the molded body for separating flow channels therein and for rigidifying the unitary body. The coupling body is provided with quick connect coupling elements at the upstream end and molded splash preventer means at the discharge end of the coupling.

6 Claims, 10 Drawing Figures

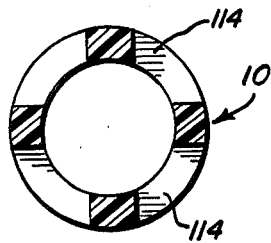
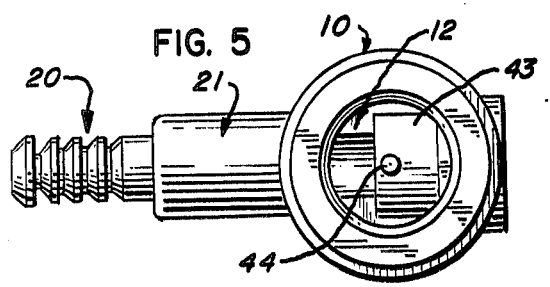
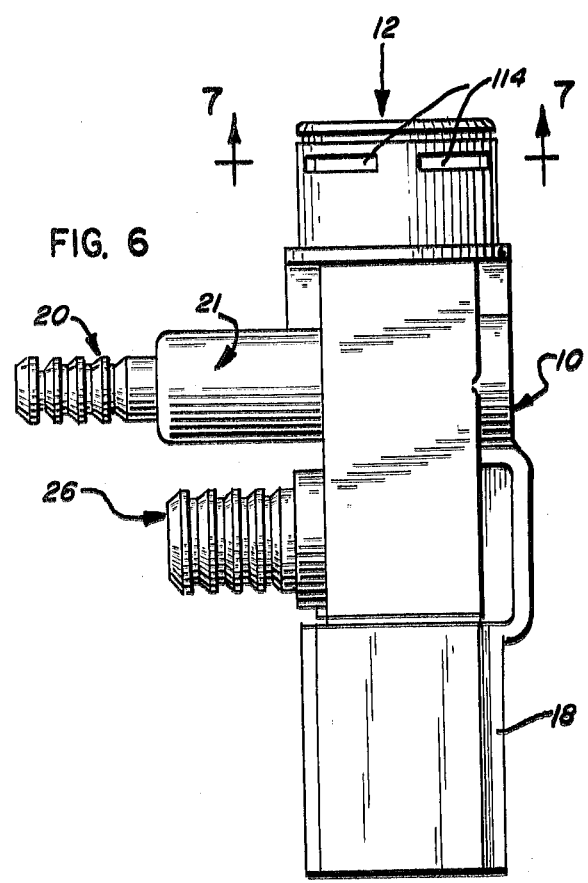
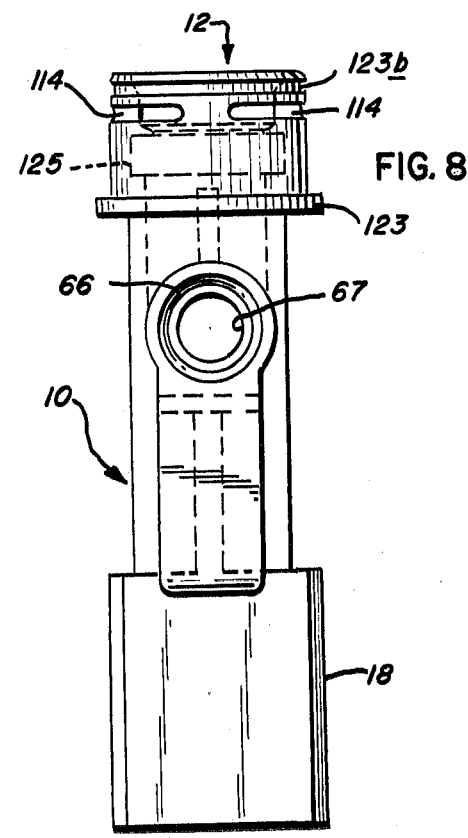
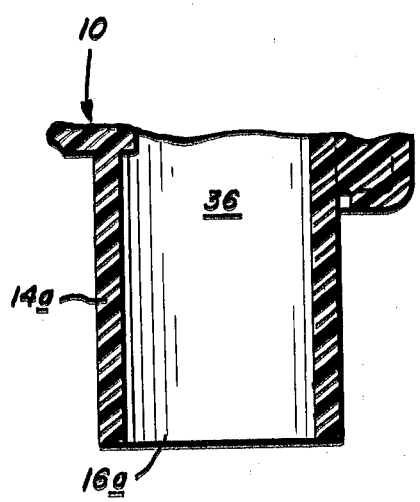

COUPLER FOR DISHWASHER

FIELD OF THE INVENTION

This invention relates to a selectively-connectable coupling, with a molded body provided with features particularly for use with an appliance such as a household dishwasher.

BACKGROUND OF THE INVENTION

Couplings which are adapted to perform multiple functions, such as the selective connection thereof to a source of potable water under pressure for delivering clean water to a remote dishwasher, and for receiving waste water from the dishwasher for discharge into the receptacle below the source of water are well known in the art as disclosed in U.S. Pat. Nos. 3,011,725 and 3,064,678. It is also known to provide in such devices bleed valve means for selectively relieving back pressure in the supply branch prior to disconnection of the coupling from the source, and to provide quick connect means on the coupling.

While the couplings of said prior art patents are being successfully used, their manufacture, using brass, to provide the necessary strength of the body, to provide strong, non-leaking connections thereof to supply and return lines, and to insure handling of pressurized water without failure or leakage, has caused such couplings to be relatively expensive. While it is generally known that use of plastic as a substitute for more expensive materials may serve to reduce costs, the complexity of the couplings of the prior art has posed unusual obstacles to providing a coupling principally in plastic, that can serve the function of a unitary coupling for connecting a portable dishwasher to a supply faucet in a kitchen.

It is, therefore, one principal object of this invention to provide a multiple-function coupling constructed principally of molded plastic and with parts thereof constructed and arranged to provide a reliable, effective, and simple yet inexpensive device.

Another object of this invention is to provide a multiple-function coupling whose body is of molded plastic and with a quick-connect feature at the attachment end thereof, wherein the major parts and extensions thereof are designed and arranged so as to take advantage of, and be especially adapted for, manufacture in plastic.

Still a further object of this invention is to provide a multiple-function coupling for transmitting therethrough supply liquid and return liquid under pressure, with a quick-connect coupler at the intake end and anti-splash means at the discharge end, and with internal bleed means between the inlet and outlet, and wherein the principle portions of the multiple-function coupling are provided with molded plastic parts.

Further objects and advantages of the invention will become apparent from the following description of a preferred embodiment of the invention.

BRIEF SUMMARY OF THE INVENTION

A selectively-connectable coupling is constructed of molded plastic to reduce manufacturing costs and with special features to provide an inexpensive and useful coupling for an appliance such as a household dishwasher. The coupling has supply and discharge nipples which are formed with integral gripping ridges and are designed of different lengths to provide convenient access for hose attachment. Quick connect coupler elements are specially adapted for use with the plastic coupling. An internal separation wall, formed as a longitudinal extension of a portion of the upper supply nipple, separates flow channels and serves to rigidify the connector while providing support for a depending flow deflector. A second longitudinal wall extending into the coupling provides support for an upwardly extending, integrally molded, stud. The two walls desirably are integral with an internal sleeve that serves as a mount for a cartridge type bleed valve means for relieving back pressure within the coupling. A lower discharge extension of the coupling serves to provide splash prevention, and provides for selective mounting thereon of a splash preventer and flow turbulence reducer.

Other features of this invention will be readily appreciated, and the same becomes better understood by reference to the following detailed description when considered in connection with the accompanying drawings, in which like reference numerals designate like parts throughout the figures thereof.

BRIEF DESCRIPTION OF THE DRAWINGS

FIG. 5 is a top plan view of the molded, unitary, body portion of the form of coupling shown in FIGS. 1–4;

FIG. 6 is a side elevational view of the coupling body portion seen in FIG. 5;

FIG. 7 is a cross-sectional view of the coupling body portion, taken substantially along line 7—7 of FIG. 6;

FIG. 8 is an elevational view of the coupling body portion, taken looking from the left of FIG. 6;

FIG. 10 is a fragmentary view of the discharge end of the coupling, showing a modified form wherein the coupling's body terminates in a simple discharge nozzle.

DETAILED DESCRIPTION OF THE INVENTION

Figure 1:
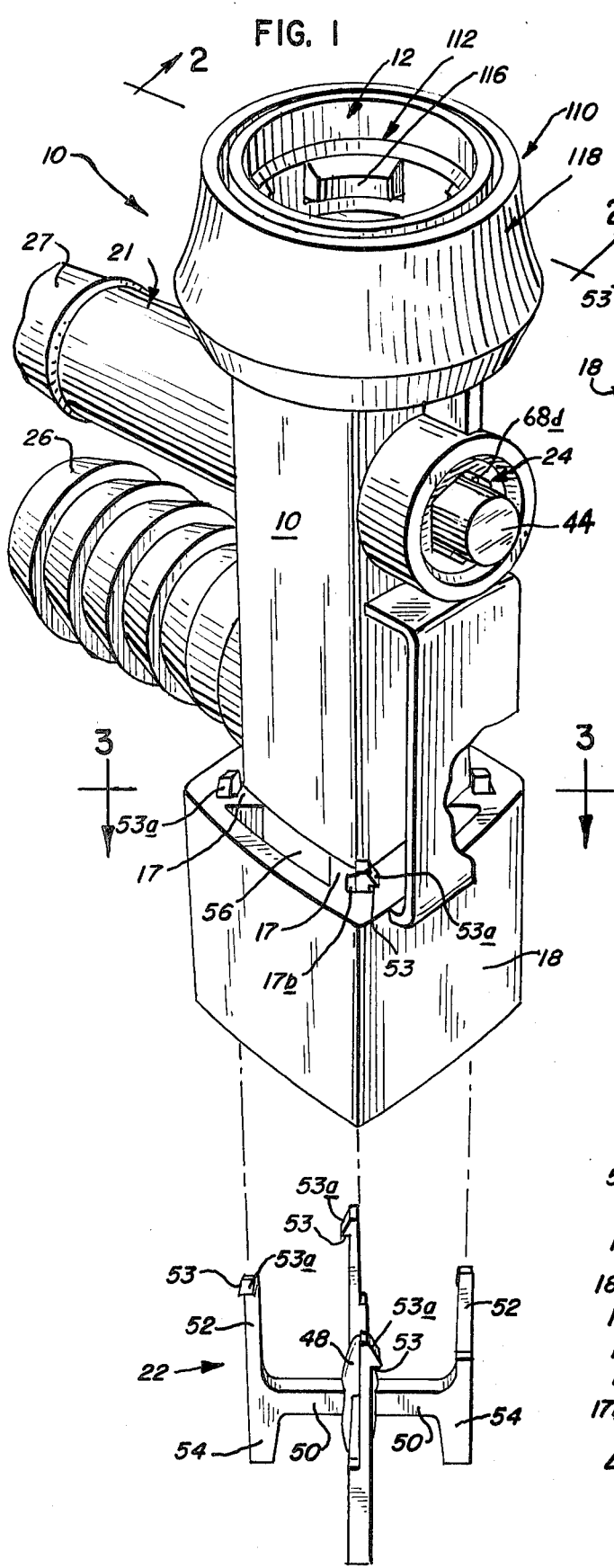
FIG. 1 is a perspective view of one form of a coupling that embodies the invention of this application, and showing by exploded view a separable splash preventer that is attachable in the discharge nozzle portion of the coupling.

Referring now to the drawings, an improved coupling embodying features of this invention is shown in FIGS 1–9. As seen in FIG. 1, the coupling includes a molded coupling body, generally indicated at 10, that is constructed to be secured to an exteriorly grooved body, such as a faucet spout, or an appliance, such as an aerator, normally provided at the discharge end of a kitchen faucet or the like. The body 10 has an upwardly facing inlet connection end opening 12 at its upper end, and a lower end 14 surrounding a discharge opening 16, and with an elongated discharge extension 18 molded integral with body 10. The coupling body 10 is a unitary, vertically elongated, generally tubular, molded plastic part that includes: a laterally projecting supply connection nipple 20 that projects laterally beyond a tubular boss 21; a waste discharge connection nipple 26 spaced vertically below tubular boss 21; a discharge end which may have a lower tubular discharge extension 18 thereon; and a bleed valve means 24 intermediate upper and lower ends of the body. The plastic body 10 vertically aligns an inlet connection end opening 12 and a lower discharge end opening 16. A separately molded splash preventer 22 may be secured within the discharge extension 18.

A quick connect, cam-operated, attachment jaw means 110 preferably is provided at the upper end of body 10. The quick connect attachment means preferably is the same as, or similar to, that described in a copending application Ser. No. 706,390 filed July 19, 1976 where such quick connect attachment means are disclosed in combination with a different type of coupler having an automatic shut-off. Since the quick connect means are fully disclosed in the above-mentioned application, only a brief description will be given herein.

At the inlet connection opening 12 of the coupling herein, a female socket 112 is defined for telescopically receiving thereinto the discharge end of a source of fluid under pressure, that is provided with an exterior circumferential groove as is well known in the art. Four slots 114 are provided, equally spaced circumferentially of female socket 112, each to slidably receive therein an interference member 116. An axially movable sleeve actuator 118 surrounds the female socket 112, and provides an inner cam member 120 shaped and arranged to bear against interference members 116 for projecting such members 116 inwardly to provide for an operative connection to the exteriorly grooved source of fluid under pressure. A compression coil spring 122 seated on annular shoulder 123 normally biases sleeve actuator 118 toward an upper position at which members 116 are thrust inwardly to a gripping position. A snap ring 123a carried in groove 123b on body 10 limits upward movement of acutator 118 and serves as a disassembly restraint. When the sleeve actuator 118 is moved downward against the bias of spring 122, cam member 120 no longer contacts interference members 116 and they are free to retract radially outward to a position at which members 116 clear the part to which they connect, thereby releasing the part to which the quick coupler 110 is to attach. A U-packing 124 is held in an undercut retention groove 125, below slots 114 to provide for sealing against the wall of the part to which the quick coupler 110 is to connect.

To provide a passage for the flow of intake fluid to an appliance, and for receiving flow from the appliance, separate flow passageways are provided in the molded body 10. Two vertically spaced, elongated, tubular nipples project laterally from one side of the body. An upper supplyconnection nipple 20, together with tubular boss 21, is integrally molded with the body 10 and positioned below the quick connect attachment means 110. A waste discharge connection nipple 26 is spaced axially below the boss 21 of supply connection nipple 20 and is also integrally molded with body 10. The longitudinal axes of nipples 20 and 26 preferably lie in a common vertical plane. A flow passage 28 is provided interiorly of tubular connection nipple 20, and communicates via opening 30 at the side wall of the body 10 to inlet flow passage 11 that communicates to inlet connection opening 12. A flow passage 32 is provided interiorly of waste discharge nipple 26 communicating via opening 34 in the side wall of body 10 with a discharge flow passage 36 that empties through the downward facing waste discharge terminus of the body 10, thereby directing waste fluid into a sink, at a point directly below the coupling inlet 12.

The supply and discharge nipples 20 and 26 vary in their lengths, and have exterior, ridged portions thereon. The ridged portions are spaced different distances from the wall of the coupling body to conveniently provide for securing hoses to the nipples 20 and 26 by use of metal clamping sleeves, such as indicated at 27. The ridged portions of the nipples include alternate exterior, annular ridges 38a and recesses 40a on nipple 20, and ridges 38b and recesses 40b on nipple 26, formed integrally with the nipple to provide for a liquid-tight seal with the interior of an appliance hose that is to be clamped thereagainst by a crimpable metal clamping sleeve.

An elongated, internal sleeve, generally 42, is integrally molded within the body 10. An upper wall 43 of sleeve 42 extends inwardly from the side wall of body 10, at a point spaced axially above the opening 30 in the side wall that communicates with the interior of supply nipple 20. Wall 43 projects past the longitudinal centerline of the body 10. Projecting upwardly from upper wall 43 and centered substantially on the longitudinal centerline of the body is a stud 44 which serves as an abutment to apply an upward force on an aerator's movable plug in the manner as disclosed in U.S. Pat. No. 3,011,725.

Sleeve 42 is also bounded by a lower wall 46 which extends across the entire tubular interior of body 10 from wall to wall. The lower wall 46 serves as a longitudinal extension of the lower wall of tubular boss 21 of supply nipple 20, to rigidify the body 10, the tubular boss 21, and the nipple 20 which are integrally molded with body 10. The interior of elongated tubular boss 21 is provided with longitudinal ribs 21a, for further rigidification, extending from one end adjacent the wall of body 10 to the end wall 21b from which the nipple 20 projects. The radial height of ribs 21a is selected to that the minimum unobstructed flow channel through boss 21 is greater than the flow passage 28 through nipple 20.

The lower wall 46, in addition to its rigidification function described above, and serving as part of sleeve 42, also serves to separate supply flow passage 11 from waste flow passage 36 that is provided within body 10. Wall 46 additionally serves to rigidify a downwardly extending flow deflector 64 that is positioned in waste flow passage 36 as described hereinafter. The sleeve 42 and the bleed valve positioned therein provide further rigidification of body 10 intermediate the longitudinal ends of body 10 and, desirably, immediately opposite the connection of body 10 to boss 21 that carries supply nipple 20 thereon. A bleed bore 46a is provided through lower wall, through which pressurized water in channel 11 may be selectively bled into discharge passage 36 by bleed valve means described hereinafter.

It is aesthetically desirable that waste fluid that is being discharged through passage 36, outwardly from the coupling, issue as a non-splash stream into the sink or receptacle therebelow. In its simplest form the lower end of body 10 may be simply extended a distance sufficient to provide an elongated discharge nozzle 14a with a discharge end opening 16a, as seen in FIG. 10. Other means contemplated herein for limiting splash are entrainment of air into the discharge stream and/or inclusion of a streamlined splash preventer in the discharge nozzle, but avoiding use of screens that might serve to accumulate thereon debris that is carried in the discharge stream.

Figure 4:
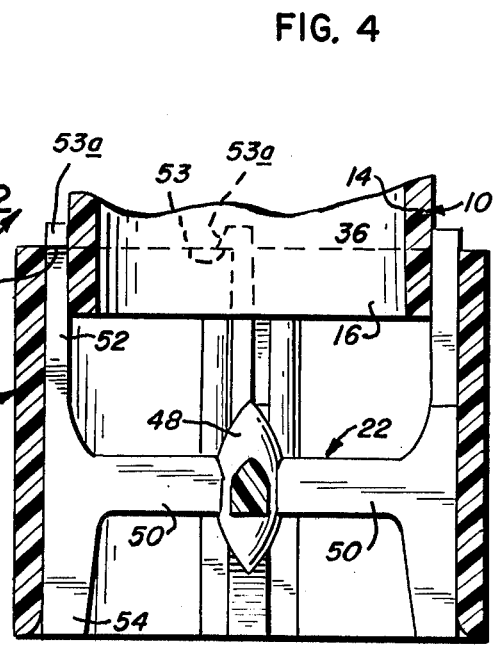
FIG. 4 is a fragmentary cross-sectional view taken substantially along line 4—4 of FIG. 3, and showing additional details of the splash preventer.
Figure 3:
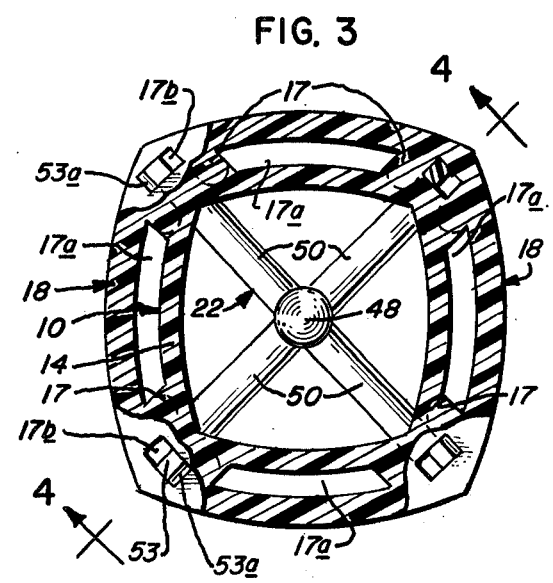
FIG. 3 is a cross-sectional view taken substantially along line 3—3 of FIG. 1 and showing details of the securement of the splash preventer to the coupling.

In the preferred form seen in FIG. 4, air entrainment means are provided as an anti-splash feature. Where additional splash prevention is sought, a removable supplemental splash preventer 22 is provided.

Figure 2:
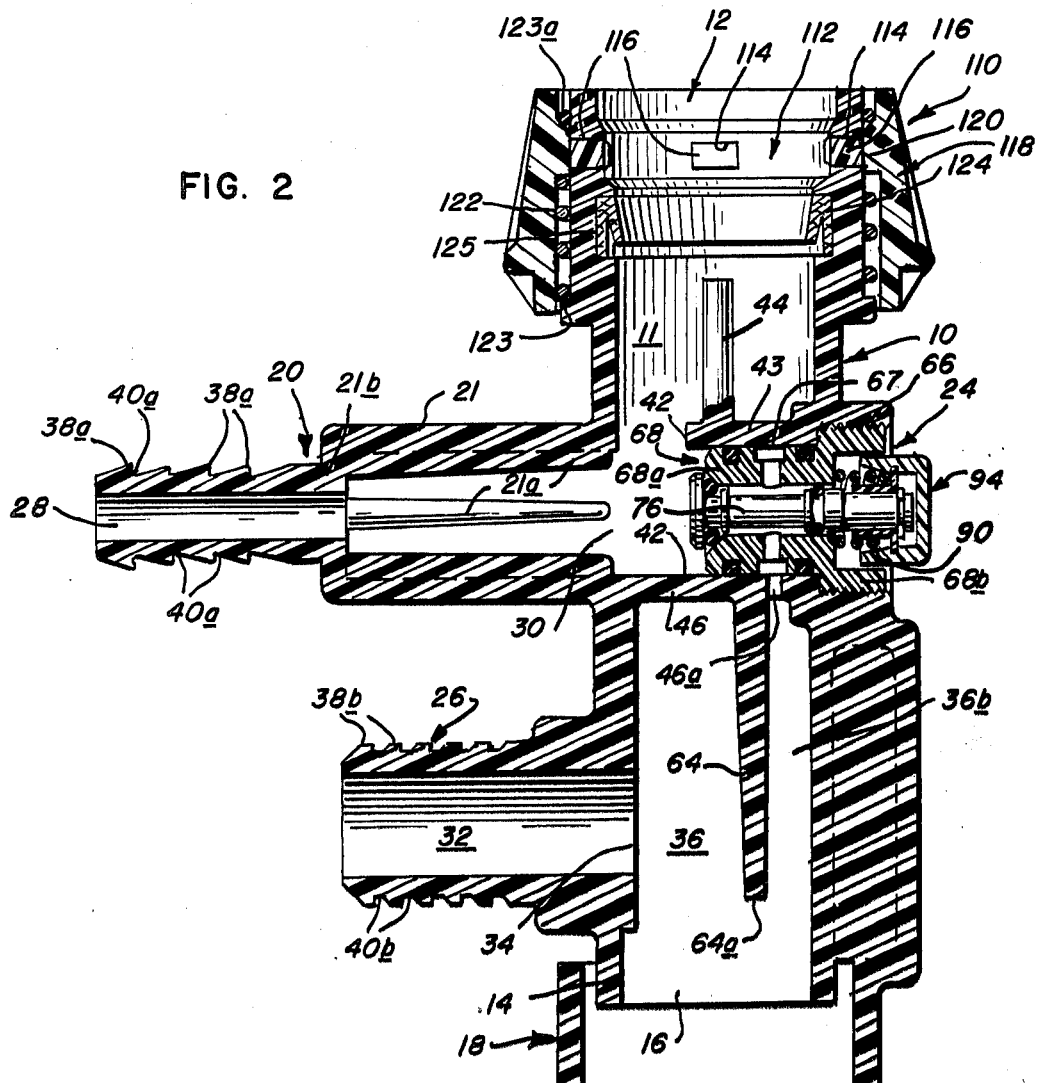
FIG. 2 is a vertical cross-sectional view of the coupling of FIG. 1 through the longitudinal axis substantially along line 2—2 of FIG. 1.

As best seen in FIGS. 1, 2 and 4, the lower end of body 10 has integral therewith a plurality of diametrically located and circumferentially spaced bosses 17 from which depends a tubular discharge extension 18. The circumferential spaces 17a, between bosses 17 and that are surrounded by the upper end of tubular extension 18, serve as air passages through which air is drawn in and entrained by the flowing stream of discharge liquid to provide a discharge stream with anti-splash character.

The removable splash preventer 22 is a one-piece, molded plastic part having a central, enlarged, vertically elongated, but longitudinally streamlined hub body 48 from which extend four radially projecting arms 50 that each merge with an upwardly extending elongated attachment leg 52 and a downwardly extending stabilizer leg 54. The attachment leg 52 tapers upwardly and is of lesser radial dimension than stabilizer leg 54 to provide flexibility for attachment leg 52. The upper terminus of attachment leg 52 has a hook 53 thereon with an adjacent cam edge 53a. The bosses 17 each have an aperture 17b therethrough which permits passage therethrough of hook 53 on attachment leg 52, with a wall of aperture 17b providing a cam surface that is engaged by cam edge 53a to provide for slight distortion of leg 52 as the splash preventer 22 is pressed upwardly into its operative position within tubular discharge extension 18. When a hook 53 clears the upper edge of apertured boss 17, the resiliency of distorted leg 52 snaps the hook 53 back into a firm supporting engagement with the bosses 17 to hold the splash preventer 22 in position without use of separate fastener means.

An elongated flow deflector 64, molded integral with wall 46, is positioned within discharge flow passage 36 and above discharge end opening 16, and directly opposite opening 34 in the side wall of body 10. The longitudinal edges of deflector 64 are integral with the walls of tubular body 10. The lower edge 64a of deflector 64 is below the lower edge of opening 34, serving to deflect waste water downwardly through discharge end opening 16 and generally preventing back flow upwardly into recess 36b to which bleed opening 46a communicates.

When disconnecting the coupling form a source of fluid under pressure, a pressure condition exists in intake channel 11 that tends to cause the fluid to squirt out and to move the detached coupling downwardly with substantial force. To avoid a pressure condition that might cause an injury or a messy condition, a bleed valve means 24 is placed in the coupling to bleed off the excess pressure before disconnecting the coupling from its attachment.

A cartridge-like, pre-assembled, bleed valve means 24 is inserted into bore 67 of sleeve 42. The bleed valve means 24 includes a tubular bleed valve housing body 68 with a reduced section 68a slidably entered into bore 67 of sleeve 42 and an enlargement 68b entering a female threaded counterbore 66 formed in the wall of body 10 opposite the supply nipple 20. The reduced section 68a of bleed valve housing body 68 is oppositely radially apertured at 70 to communicate with annular flow recess 71 that is positioned to communicate freely with bleed bore 46a. Flow recess 71 and bleed bore 46a are isolated by first and second O-rings 72 and 74 that sealably engage bore 67 and are positioned on reduced valve body portion 68a respectively in annular grooves 73 and 75 spaced on opposite sides of flow recess 71. The enlarged valve body portion 68b is securely held in body 10 by an exterior screw threaded connection 68c. The valve body portion 68b has an internal hex recess or socket 68d for receiving an appropriate tool for securing the bleed valve means 42 in position in body 10.

The control element of bleed valve means 42 includes a central longitudinal bore 69 through reduced section 68a of housing body 68, said bore 69 communicating with radial apertures 70, and a selectively reciprocable valve stem 76 extending through bore 69. Stem 76 is shaped to provide spaced retaining grooves 78 and 80 for receiving O-rings 78a and 80a that bound a central annular groove 82 that communicates with apertures 70. The inner end of stem has an enlarged head 77, of greater diameter than bore 69, that also bounds groove 78. The O-rings 78a and 80a normally seal bore 69, but when the stem 76 is pressed to the left as seen in FIG. 9, O-ring 78a is unseated from tapered valve seat 69a and flow is established from flow passage 11 through central annular groove 82, through radial apertures 70, annular flow recess 71 and bleed passage 46a.

Figure 9:
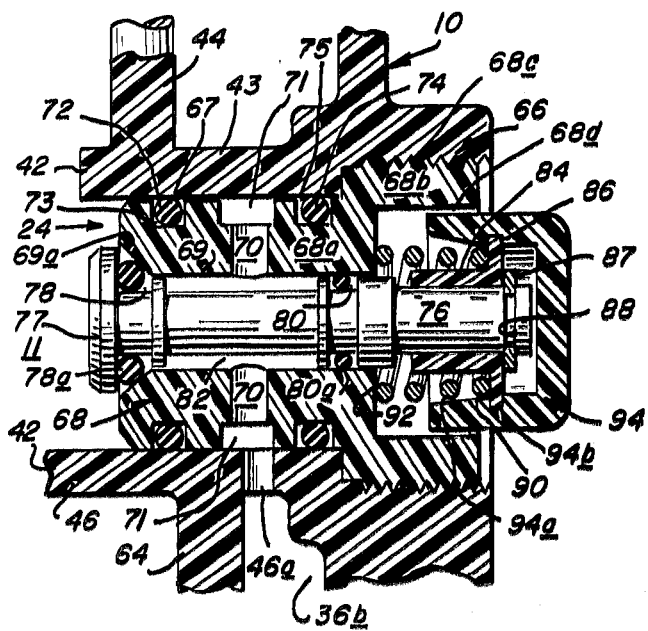
FIG. 9 is an enlarged cross-sectional view of the bleed valve assembly seen in FIG. 2.

The outer or right hand end of stem 76, as seen in FIG. 9, has a molded sleeve 84 slipped thereon. Sleeve 84 has a circumferential mounting and abutment flange 86 thereon. Sleeve 84 is retained on stem 76 by a snap ring 87 in groove 88 on stem 76. A restoring compression coil spring 90 surrounding stem 76 is positioned between flange 86 and bottom wall 92 of socket 68d. A cup-shaped control button 94 is provided with a tapered inner wall 94a on the cup's skirt serving as a conical cam leading to an inner groove 94b for snap fit into the outer edge of flange 86 to cause button 94 and sleeve 84 to be assembled to move in unison. The axial length of the skirt of cup-shaped button 94 serves as a control stop that engages bottom wall 92 to limit inward movement of stem 76.

While there has been disclosed one form of the invention, it will be understood that the invention may be utilized in other forms and environments, so that the purpose of the appended claims is to cover all such forms of devices not disclosed but which embody the invention disclosed herein.

What is claimed and desired to be secured by Letters Patent of the United States is:

1. In a coupling having an upwardly facing inlet connection end opening and a downwardly facing waste discharge end opening, laterally opening supply and waste connections, and flow passages including a first passage for supply water between inlet end and supply connection, a second passage for waste water between the waste connection and waste discharge opening, and a third passage selectively establishable between said first and second passages, the improvement comprising, in combination:

a unitary, vertically elongated, generally tubular plastic body providing vertically aligned upper inlet end and lower discharge end openings;

two elongated tubular nipples each defining therethrough a laterally extending flow passageway, the nipples being vertically spaced along and molded integrally with said plastic body; an elongated sleeve within the body molded integrally therewith and axially aligned with the uppermost of the two nipples, a portion of the side wall of the upper nipple being extended to provide an integral separation wall extending transversely across the interior of the tubular body and serving as part of the side wall of the elongated sleeve to provide both a rigidified construction and a wall for separating the supply passage to the upper nipple and the waste discharge passage from the lower nipple; a countersunk recess in the wall of the body adjacent the elongated sleeve, a selectively actuatable bleed valve means including a tubular valve housing, with sealing means thereon, having an inner, laterally apertured, tubular part slidably inserted into the elongated sleeve to aid in rigidification, and for passage of bleed water therethrough, and an outer part with means thereon secured in the countersunk recess; the internal separation wall having integral therewith a downwardly extending, elongated flow deflector wall extending into said second passage, with the longitudinal edges of the deflector wall integrally connected with wall portions of the tubular body for rigidifying both the separation wall and the tubular body, and a bleed passage through the separation wall and communicating with the elongated sleeve for allowing water to be bled through the bleed valve means toward the discharge end opening of the tubular body.

2. A coupling as in claim 1 including a tubular discharge extension integral with said tubular plastic body at the lower end of said body, with portions of the upper end of said tubular sleeve being spaced from the sidewall of the tubular plastic body to provide air passageway means therebetween.

3. A coupling as in claim 2 including mounting means formed on the tubular sleeve discharge extension; and a splash preventer with a plurality of flexible arms constructed for selective entry into the tubular sleeve, and with said arms arranged for cooperation with said mounting means to provide for selective mounting of the splash preventer in the coupling.

4. A coupling as in claim 1 wherein the elongated, tubular nipples have connection means thereon that are spaced from the body to different extents.

5. A coupling as in claim 4 wherein the connection means on the lower nipple are positioned closer to the body than are the connection means on the upper nipple.

6. In a coupling having opposed inlet connection and waste discharge end openings, supply and waste connections, a first supply flow passage between the inlet connection and the supply connection, a second waste flow passage between the waste connection and the waste discharge opening, and a third selectively establishable flow passage between said first and second passages, the improvement comprising in combination:

a unitary molded, generally tubular, elongated, plastic body having aligned upper inlet connection and lower waste discharge openings, two vertically spaced elongated, tubular nipples integrally formed on and extending laterally of the body for supply and waste connections, a lower separation wall integrally formed within the body as an extension of the lower wall of the upper nipple and separating the first and second flow passages, an upper laterally extending wall spaced laterally from the supply connection nipple and above said separation wall, said upper wall and the separation wall cooperating to define an internal sleeve;

selectively actuatable bleed valve means housed in said internal sleeve;

an elongated flow deflector wall integrally formed with and depending from the waste discharge opening side of the separation wall and extending downward below the lower waste connection nipple;

a bleed bore through the separation wall whereby selective activation of the bleed valve means establishes communication between the supply flow passage and the discharge flow passage through the bleed bore; and the internal sleeve serving to rigidify the plastic body.

* * * * *